United States Patent [19]

Kurz

[11] Patent Number: 5,802,249
[45] Date of Patent: Sep. 1, 1998

[54] CABIN WITH A RADIANT HEATING SYSTEM

[76] Inventor: Hubert Kurz, Uhdestrasse 39, D-81477 München, Germany

[21] Appl. No.: 591,546
[22] PCT Filed: Aug. 16, 1994
[86] PCT No.: PCT/EP94/02730
 § 371 Date: Apr. 1, 1996
 § 102(e) Date: Apr. 1, 1996
[87] PCT Pub. No.: WO95/05142
 PCT Pub. Date: Feb. 23, 1995

[30] Foreign Application Priority Data

Aug. 16, 1993 [DE] Germany ............... 43 27 542.7

[51] Int. Cl.⁶ ...................................................... F24D 13/00
[52] U.S. Cl. .................. 392/347; 392/354; 392/355; 392/359; 392/371
[58] Field of Search ...................... 392/347, 350, 392/352, 359, 360, 363, 370, 371, 375, 376, 407, 416, 422, 423, 424, 430, 435, 436, 437, 439, 394, 524, 354; 219/407, 512

[56] References Cited

U.S. PATENT DOCUMENTS

| | | | |
|---|---|---|---|
| 2,230,095 | 1/1941 | Van Damm | 392/436 |
| 3,564,201 | 2/1971 | Jones et al. | 392/372 |
| 3,691,345 | 9/1972 | Needham et al. | 392/436 |
| 4,851,646 | 7/1989 | Perala | 219/483 |
| 4,939,344 | 7/1990 | Perala | 392/354 |

FOREIGN PATENT DOCUMENTS

| | | |
|---|---|---|
| 0 287 106 | 4/1988 | European Pat. Off. . |
| 2 053 727 | 7/1969 | France . |
| 1 923 496 | 1/1971 | Germany . |
| 26 19 820 | 3/1978 | Germany . |
| 3223447 | 2/1983 | Germany . |
| 32 10172 | 9/1983 | Germany . |
| 32 26742 | 1/1984 | Germany . |
| 33 03604 | 8/1984 | Germany . |
| 34 21110 | 12/1985 | Germany . |
| 37 28 378 | 2/1988 | Germany . |
| 37 13184 | 3/1988 | Germany . |
| 38 04570 | 8/1989 | Germany . |
| 89 13 884.8 | 4/1990 | Germany . |
| 89/13 884.8 | 4/1990 | Germany . |
| 391 802 B | 12/1990 | Germany . |
| 40 01 446 | 12/1990 | Germany . |
| 40 31923 | 4/1991 | Germany . |
| 41 31683 | 4/1993 | Germany . |
| 42 01 358 | 7/1993 | Germany . |
| 42 14769 | 11/1993 | Germany . |
| 606 709 | 11/1978 | Switzerland . |
| 1127963 | 12/1984 | U.S.S.R. . |
| 1755703 | 12/1985 | U.S.S.R. . |
| WO 90/01918 | 5/1989 | WIPO . |

Primary Examiner—Tu B. Hoang
Attorney, Agent, or Firm—Burns, Doane, Swecker & Mathis, L.L.P.

[57] ABSTRACT

A cabin has a heating system integrated into one of its side walls. The heating system is arranged between an inner wall layer and an outer wall layer and has an ambient air channel with an inlet at the bottom and an outlet at the top. The heating system is designed to be space-savingly arranged within the cabin and to ensure a uniform heat distribution inside the cabin. The cabin thus has a large-surface radiant heating system built into the side walls and supplemented at its rear side relative to the outer wall layer by a reflecting layer that reflects the radiation of the radiant heating system into the cabin through the wooden inner layer.

32 Claims, 6 Drawing Sheets

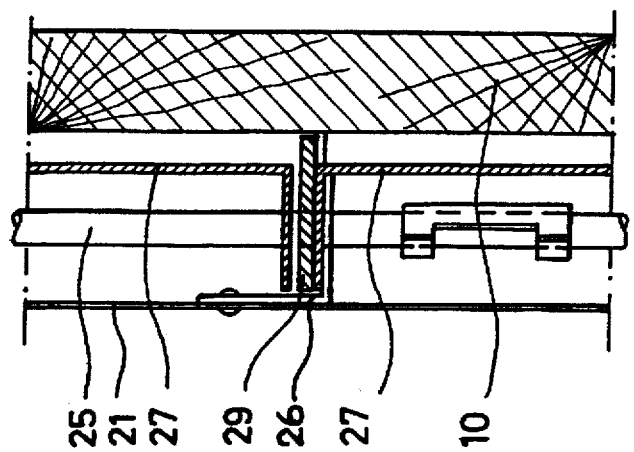
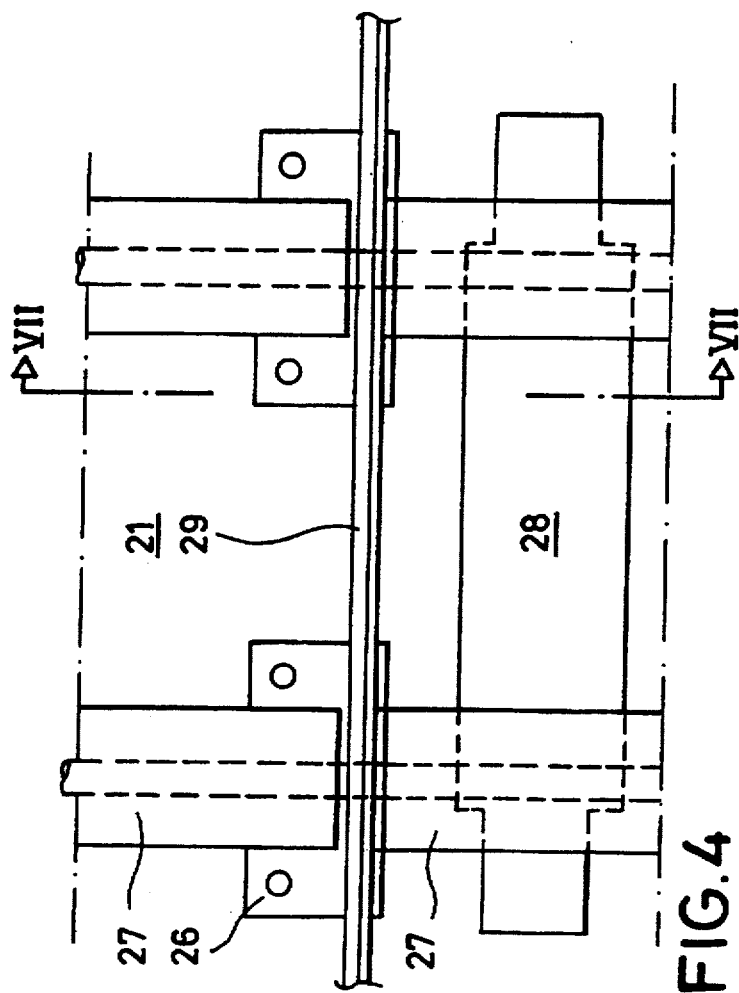
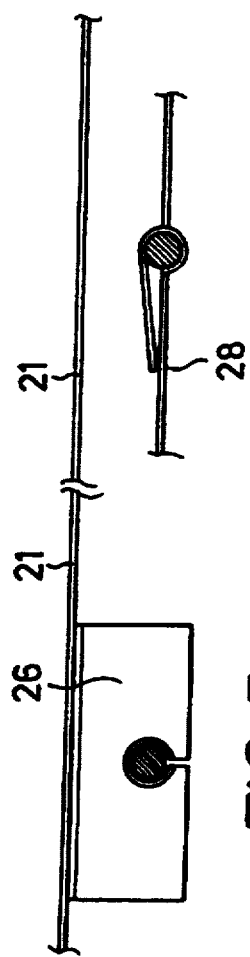

CABIN WITH A RADIANT HEATING SYSTEM

This is a continuation of PCT/EP94/02730, filed Aug. 16, 1994, entitled "Kabine mit einer Flächenheizung" ("Cabin with a Radiant Heating System"), now published as WO 95/05142, on Feb. 23, 1995.

BACKGROUND OF THE INVENTION

1. Field of the Invention

The present invention relates to a cabin having a heating system integrated into one of its side walls and positioned between an inner wall layer and an outer wall layer in an ambient air channel having an inlet at the bottom and an outlet at the top.

2. Description of the Related Art

A cabin of this type is formed as a sauna cabin and known from DEA-32 23 447. The heating system is arranged at a location of a side wall in a recess which extends from the floor approximately up to the middle of the room and ends at the top through an inclined portion on the inner wall layer. It is recessed within the recess which is partly covered forwardly by screens. A fire barrier layer and an insulation are provided on the back side of the recess.

The conventional heating system of sauna cabins consists of an electrically heatable stove of metal which is preferably arranged in a corner of the cabin at some distance from the wall. This stove has several disadvantages. It occupies a relatively large space within the cabin. Furthermore, there is the risk of injuries upon contact with hot parts and of objects being burnt when being inadvertently placed thereon. Furthermore, the heat emission that takes place at one point is disadvantageous.

The risk of injuries is at least reduced in the case of the electric heater which is now arranged in a recess. Objects can no longer be placed thereon in the same manner, whereby this risk is also reduced.

However, there remains a disadvantageous heat emission, since heat is centrally emitted for the whole cabin from one place, resulting in warm and cold areas within the cabin.

Other types of stoves have been developed in view of the above-mentioned disadvantages. There are so-called sub-bench stoves on the market which have such a flat structure that they can be accommodated below a bench. This also saves the extra space needed for an upright stove.

In another constructional variant, the stove is long and small. It is placed near the floor in front of a wall and has a panelling as a protection against accidental contact. Space can thereby not be saved, since, instead of the approximately square area required for the stove, an equally large, but elongated area is now needed.

Finally, it is known that a sauna stove is arranged in the cabin ceiling. Any floor area for the stove can thus be dispensed with entirely; however, there is no thermal convection, which necessitates a centrifugal fan for ensuring the necessary circulation of air. Since the heat is here supplied from the top, this leads to a physiologically disadvantageous heat distribution.

The decisive disadvantage of all of the above-mentioned stove variants is their functional principle. Ambient air is greatly heated within a small area on the surface of highly heated tubular heating elements. The ambient air transports the heat, thermally or driven by a fan, convectively relatively irregularly to the inner wall surfaces, which are consequently heated at a slow pace and irregularly.

This leads to a considerable heat drop from the top to the bottom, which is objected to by many users as being unpleasant. The heating duration for the walls is relatively long. The preparation time causes considerable energy losses, since a considerable amount of energy is dissipated through the walls, the ceiling and the floor and due to the change of air during this time interval and has to be additionally supplied by the stove.

SUMMARY OF THE INVENTION

It is the object of the present invention to create a space-saving heating system for use in the above-mentioned cabin which ensures a uniform heat distribution within the cabin in a simple manner.

This object is achieved according to the invention in that the cabin has a large-surface radiant heating system built into the side walls and supplemented at its rear side relative to the outer wall layer by a reflecting layer that reflects the radiation of the radiant heating system into the cabin through the wooden inner wall.

The radiant heating system which is integrated into the side wall is not comparable with a sauna stove which is operative at one location. The radiant heating system emits heat over a large surface and via convection and/or radiation to the interior of the cabin, the degree of convection and radiation being variable, depending on the place of installation of the radiant heating system and the design of the interior of the cabin.

The wooden inner wall layer is heated relatively rapidly and over a large surface from the inside, the surface temperatures of the heating elements being relatively low. Heating is first performed directly or indirectly via the radiation reflected by the reflecting layer into the interior of the cabin. In addition to the radiation, convection may be exploited for transporting heat into the interior of the cabin and for achieving a purposeful circulation of air.

The large-surface action of the radiant heating system is very pleasant for a user. The cabin need no longer be heated at one point, as has so far been customary, such a one-point heating being replaced by a large-surface, uniform heating of the inner walls of the cabin which is not so hot any more and which, depending on the installation of the radiant heating system within the side walls of the cabin, ensures a harmonious heat emission into the cabin.

Convection in the vicinity of the radiant heating system may intentionally serve the circulation of cabin air in a uniform manner and no longer at one location as has so far been the case. At the same time, fresh air can be mixed with ambient air to enrich the interior of the cabin with fresh air.

The high degree of emission of the radiant wooden surface is especially advantageous in the present invention. It is considered to be especially pleasant. When touching the warm wood, one will not get burnt.

It is advantageous with a view to obtaining the desired large surface of the radiant heating system when the ambient air channel and/or the fresh air channel extend substantially over the whole height of the wall, or of the cabin. The same applies to the radiant heating elements themselves, because the heat output per area can be reduced due to the large-surface arrangement of said elements.

The cabin of the invention has an ambient air channel. In addition to this channel, the side wall may have a fresh air channel which preferably extends in parallel with the ambient air channel and serves to enrich the ambient air with fresh air. In an advantageous development of the invention, the reflecting layer separates the ambient air channel from the fresh air channel. This achieves several advantages at the same time. First of all, the reflecting layer can be moved closer to the inner wall layer and the radiant heating system, respectively, whereby the path of reflection of the radiation towards the wooden inner wall layer becomes shorter.

The reflecting layer reflects most of the radiant heat of the radiant heating system through the inner wooden wall layer into the interior of the cabin. A small portion exits rearwards towards the outer wall layer. It is again transported back into the interior of the cabin, namely by the fresh air which flows past the rear side of the reflecting layer, so that the loss of radiant heat is minimized by this arrangement.

In an advantageous development of the invention, the ambient air channel and the fresh air channel run into the interior of the wall, namely preferably in the upper portion thereof. Depending on the rate at which the fresh air is to be heated up to the ambient air temperature, the mixing chamber may be given a greater or smaller size. It may also extend substantially over the whole height if a very early mixing of fresh air and ambient air is desired. Both air channels may advantageously end via a joint outlet at the inner wall layer, i.e. preferably in the upper portion therof.

To make the radiant heating system accessible, i.e., the various heating elements, the electric supply, the control, etc., it is advantageous when the inner wall layer can be removed. As a result, these members and the channels, respectively, are accessible not only during installation and repair, but also during cleaning.

If a convection of the radiant heating system is to be avoided, the heating elements may be provided with additional heat guiding surfaces that consist preferably of aluminum.

By contrast, if one wishes to intensify the radiation of the radiant heating system, accumulating webs which serve as air flow barriers could be provided in the ambient air channel. They largely interrupt the flow of air within the ambient air channels, shielding the same in an airtight manner.

With sauna cabins it is already known that wall elements are built in accordance with the modular principle. The elements are preferably of the same height, but their width is a multiple of the basic size of a module. All units can be interconnected in any desired manner, so that sauna cabins can be assembled rapidly by using modules.

In a preferred development of the invention, at least some wall elements are formed as heating wall elements, these heatable wall elements being dimensionally identical with those having no heating, so that they can also be used in the modular system.

In the invention, this entails special advantages that go beyond a simple installation of the cabins. Since the heating wall elements fit into the same module as the non-heatable wall elements, a cabin can be optimized in accordance with a user's needs and in accordance with the requirements of the given installation space of the cabin. This means not only that heating wall elements can be provided there at locations where corresponding feed lines for power and air are provided for, but also at locations where heating wall elements are required for optimizing the heat and air distribution and where non-heatable wall elements should be used.

In this respect the modular system in the invention has two functions: the one regarding optimization of the heat and air supply has to be held in even higher esteem than the one regarding a simplified structure, installation and repair.

To achieve a kind of spiral flow within a cabin, it is advantageous when heating wall elements and non-heatable wall elements are alternately arranged side by side. It is advantageous when a vent hole is arranged on one of the side walls, if possible, at the bottom. When the heating wall elements are arranged on opposite side walls and when the vent hole is provided on a third side wall, this will effect a spiral flow which ensures a very uniform heat and air distribution.

A similar effect is achieved with a roll-type or double roll-type flow. Such a flow can be obtained when the heating wall elements and the non-heatable wall elements, respectively, are opposite to each other as equal pairs on opposite side walls. In the area of the pair of heating wall elements, convection induces the rolltype flow; it is also transmitted to a possibly adjacent pair of non-heatable wall elements.

BRIEF DESCRIPTION OF THE DRAWING FIGURES

The radiation which is emitted in the invention from the radiant heating system is preferably reflected by a reflecting layer back into the interior in the case of the adjacent non-heatable wall elements, the layer being preferably mounted on the non-heatable walls.

As far as walls or side walls are mentioned in the present invention, this does not exclude the floor or ceiling of the cabin. The latter may also be provided with radiant heating systems, air channels, reflecting layers, etc. to satisfy the object of the invention.

Embodiments of the invention will now be described in the following, wherein

FIG. 4 is a front view of a radiant heating system provided with accumulating webs and heat guiding plates;

FIG. 5 is a horizontal section through the radiant heating system in the area of the mounting;

FIG. 6 is a horizontal section through the radiant heating system in the area of the heat guiding plates;

FIG. 7 is a vertical section through the arrangement of FIG. 4 according to line VII—VII;

DETAILED DESCRIPTION OF PREFERRED EMBODIMENTS

Figure 9:
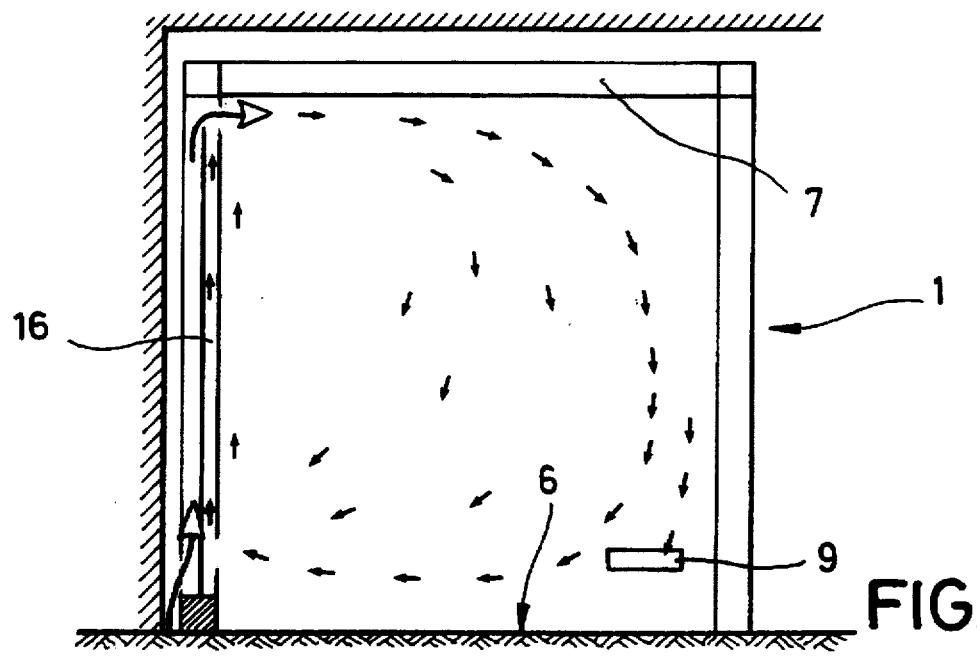
FIG. 9 is a vertical section through the cabin of FIG. 8.
Figure 8:
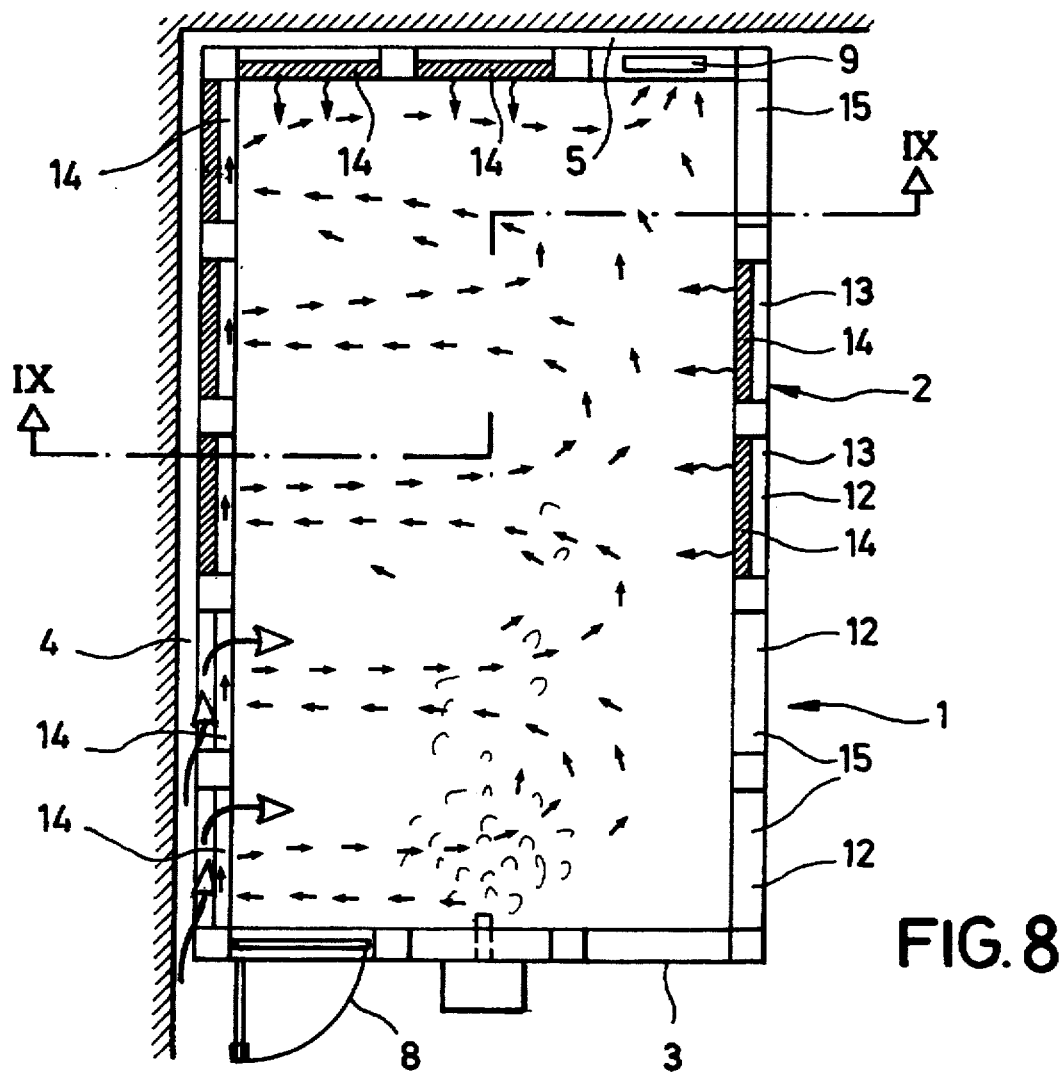
FIG. 8 is a horizontal section through a cabin with a spiral flow.
Figure 11:
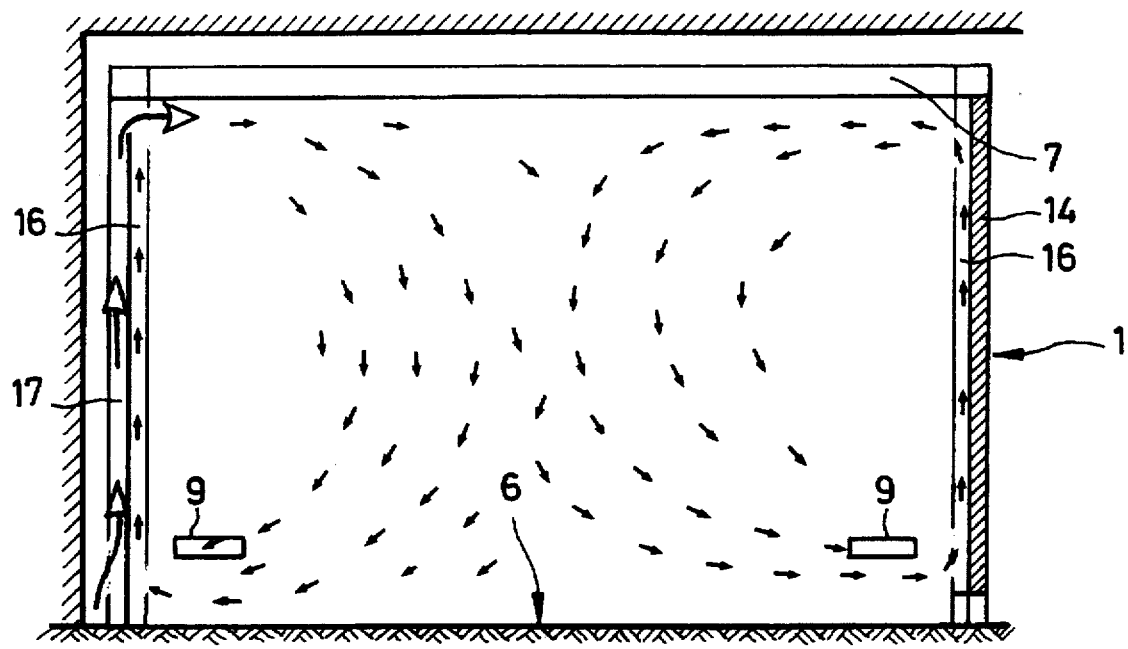
FIG. 11 is a vertical section through the cabin of FIG. 10.
Figure 10:
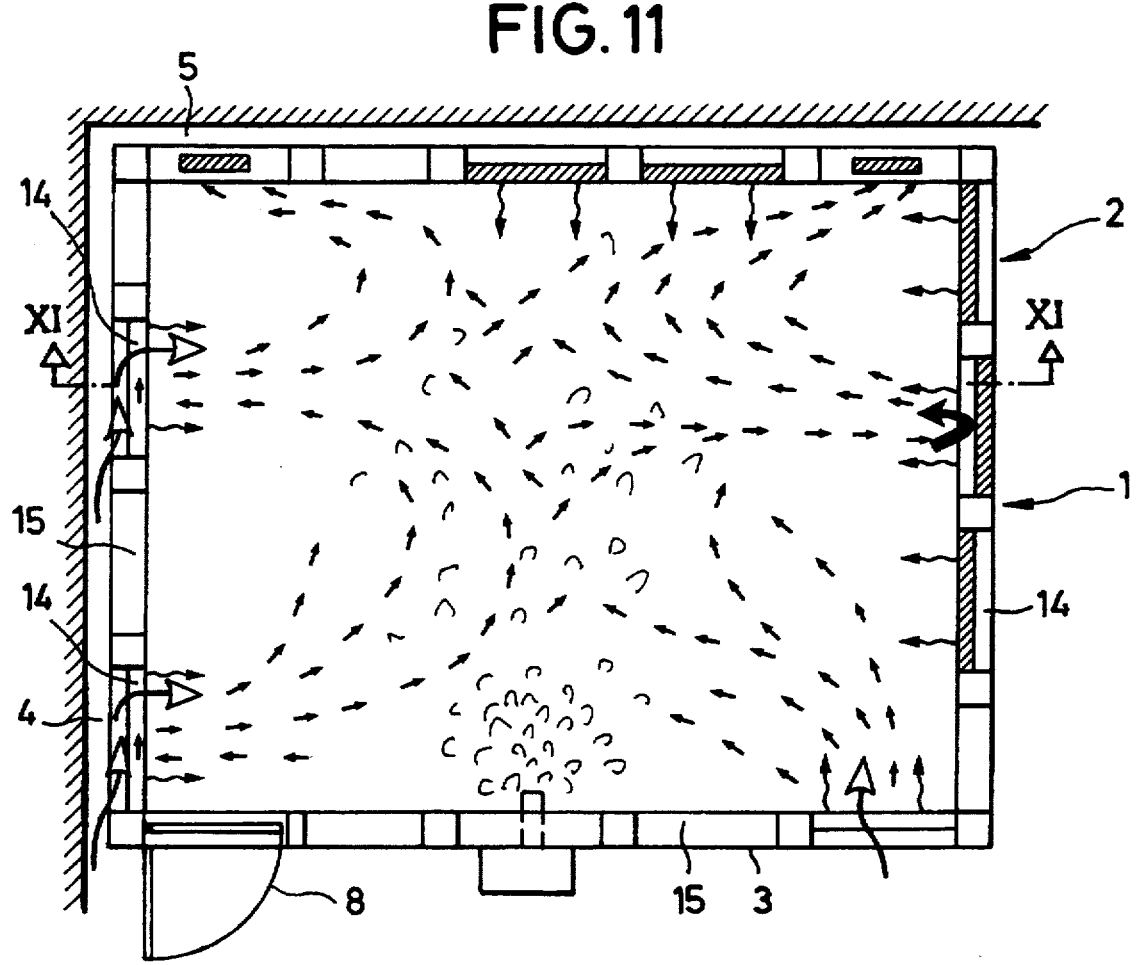
FIG. 10 is a horizontal section through a cabin with roll-type flow.

The present invention relates to cabins 1, as are shown in FIGS. 8 and 10 in horizontal section, or in FIGS. 9 and 11 in vertical section.

They serve sauna, steam bath, inhalation purposes, etc. and have most of the time a rectangular plan. They have vertical side walls 2, 3, 4, and 5, and a floor 6 and a ceiling 7. A door 8 for entering the interior of the cabin is provided on a side wall 3. One or a plurality of vent holes 9 are preferably provided in the lower portion at one or a plurality of locations of the side wall.

There are many modifications for cabins of such types, since the cabins must most of the time be tailored to the available installation rooms. The ground plan need therefore not necessarily be rectangular, the side walls not necessarily in parallel with one another or vertical. Therefore, as far as size and design of the cabin are concerned, any desired mixed forms are possible.

Each cabin wall has an inner wall layer 10 and an outer wall layer 11 which form the respective peripheries of the side wall. Each inner wall layer faces the interior of the room; each outer wall layer faces the exterior of the cabin.

In the present invention, the walls are preferably subdivided into wall elements 12 which can be assembled in modular fashion to obtain respective cabin walls. The dimensions of these modules are identical, or the modules are in one dimension a multiple of a basic dimension, so that the wall elements can be assembled in any desired manner to obtain a cabin.

In the invention, there are side wall portions which are equipped with a radiant heating system 13. If use is made of a modular technique when the side walls are mounted, there will consequently be heating wall elements 14 which comprise said radiant heating system, and non-heatable wall elements 15 which do not have such a radiant heating system.

Figure 1:
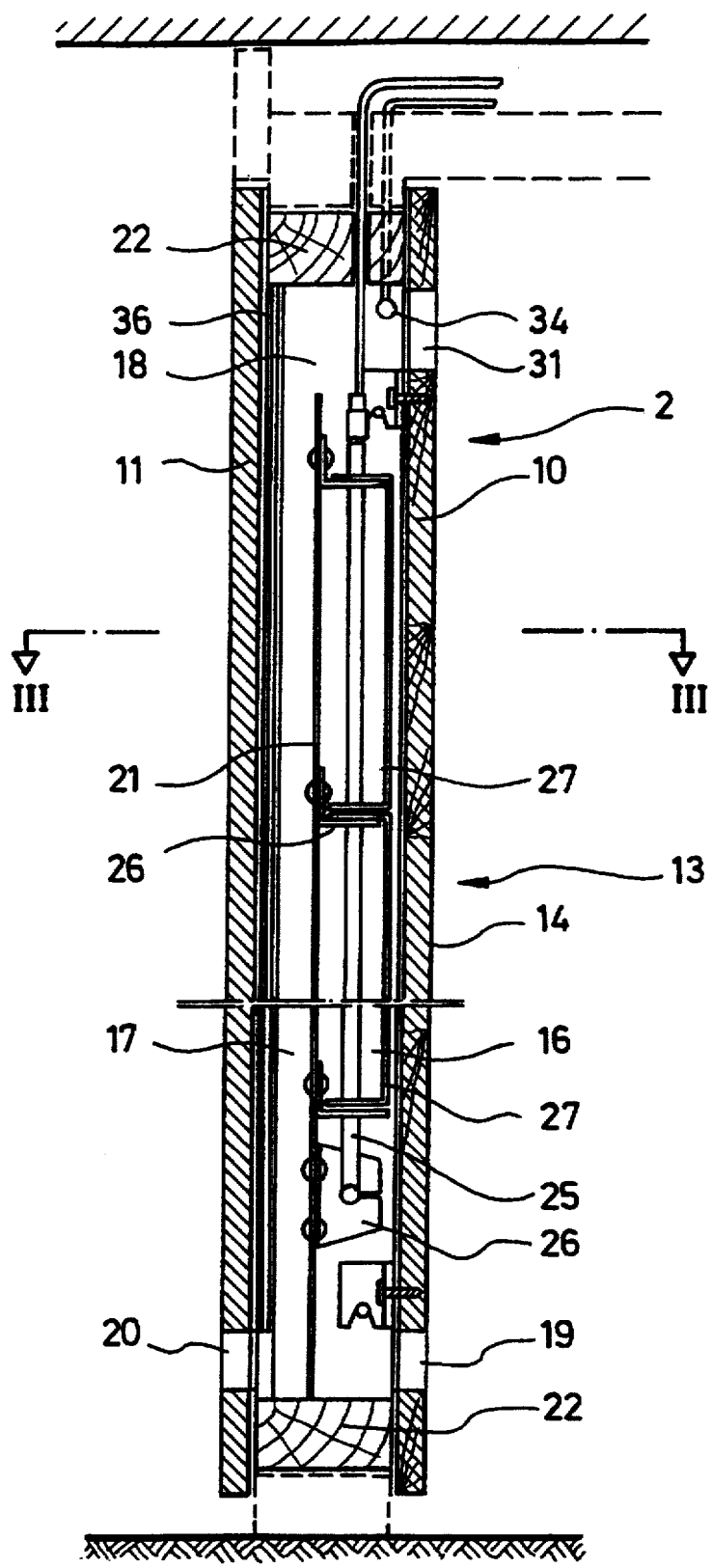
FIG. 1 is a vertical section through a heating wall element of the invention.

FIG. 1 illustrates a heating wall element 14 of a modular design. In the absence of a modular technique, the basic structure is, however, the same, and that is why the following description is applicable in general.

A space which in the present case has an ambient air channel 16, a fresh air channel 17 and a mixing chamber 18 is provided between the inner wall layer 10 and the outer wall layer 11.

In the lower portion of the wall element, the ambient air channel comprises an inlet 19 which is disposed on the inner wall layer 10. The fresh air channel has an inlet 20 at about the same level, but on the outer wall layer 11. Both channels extend almost over the whole height of the heating wall element 14 and the cabin 1, respectively. The same applies to the width of the channels; they extend up to the lateral ends of the wall elements, as is especially illustrated in FIG. 3. The two channels extend in parallel with each other in vertical direction by analogy with the orientation of the illustrated heating wall element 14. However, if required under a specific installation situation, it is also possible to arrange the wall element in an inclined position within the room.

Figure 2:
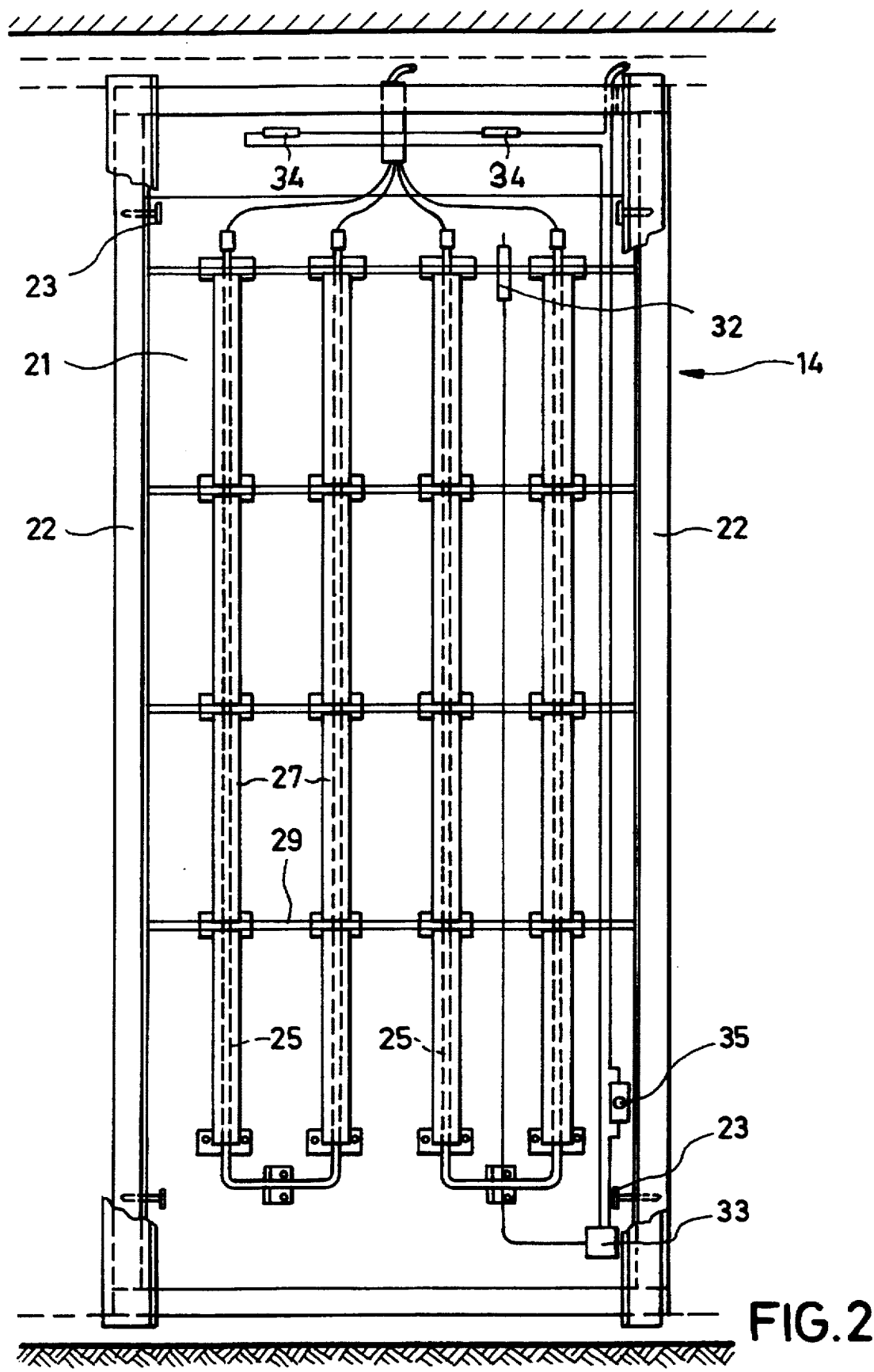
FIG. 2 is a top view on the heating wall element of FIG. 1 with the inner wall layer being removed.

The ambient air channel is separated from the fresh air channel via a reflecting layer 21 which has the shape of a panel 21 and consists preferably of aluminum. FIG. 2 shows that the panel occupies almost the whole surface of wall element 14. It is held within a wooden frame 22 by lateral fastenings 23 which simultaneously form a releasable mounting for the inner wall layer 10 which can be removed from the interior of the cabin.

The reflecting layer serves to reflect the radiation emitted from the radiant heating system 13 into the interior of the cabin.

Hence, it is heated up and that is why it is connected with its lateral mounting via elastic end legs 24 to the fastenings 23.

In the middle of the wall element 14, it is additionally secured to the outer wall layer 11.

The reflecting layer 21 is self-supporting and serves as a support for the radiant heating system 13 which in the present case consists of at least one U-shaped tubular heating element 25 each wall element. The tubular heating elements are electrically heatable. The tubular heating elements of one wall element or of a plurality of wall elements can be connected in parallel with one another to achieve a heat emission through radiation and convection at the same time. By contrast, if more importance is attached to a pure wall radiation, the tubular heating elements are to be connected in series.

The tubular heating elements are detachably mounted via angular mountings 26 on the reflecting layer 21. Detachability is easily achieved by the angles being provided on their horizontal legs towards the interior of the cabin with a slit which may be bent up for releasing the tubular heating elements.

To reduce or prevent a direct radiation of the tubular heating elements towards the inner wall layer 10, the tubular heating elements may be provided with stripped screens 27 which are also detachably arranged on the tubular heating elements 25. They prevent adjacent sections of the inner wall layer 10 from getting burnt in the immediate vicinity of the tubular heating elements.

The screens 27 consist preferably of aluminum and, when viewed laterally, are U-shaped, the respective U-shaped legs establishing a connection with the tubular heating elements 25. By analogy with the mountings 26, the legs can be detached via slots which lead to the penetration opening of the tubular heating elements.

When the cabin is designed, place and kind of heat emission can be predetermined with regard to the ground plan, the arrangement of the furniture, the door, the window, the vent hole, etc.

The degree of radiation and/or convection can be varied purposefully to achieve the desired optimization. The convection is, for instance, improved, by using heat guiding plates of aluminum 28 that have a high conducting capacity, but only a small heat emission through radiation. The heat guiding plates 28 can be secured by lateral legs to the tubular heating element, the legs being bent around the tubular heating elements.

The surface of the tubular heating body 25 can at least be doubled by a guide plate.

By contrast, if one wishes to intensify the radiation, accumulating webs 29 may be used. With such webs, the ambient air channel is subdivided into a plurality of superimposed chambers which are substantially airtight and suppress convection. To this end, they are arranged in horizontal fashion in the ambient air channel and rest tightly between the reflecting layer 21 and the inner wall layer 10, as can be seen in FIG. 7.

Figure 3:
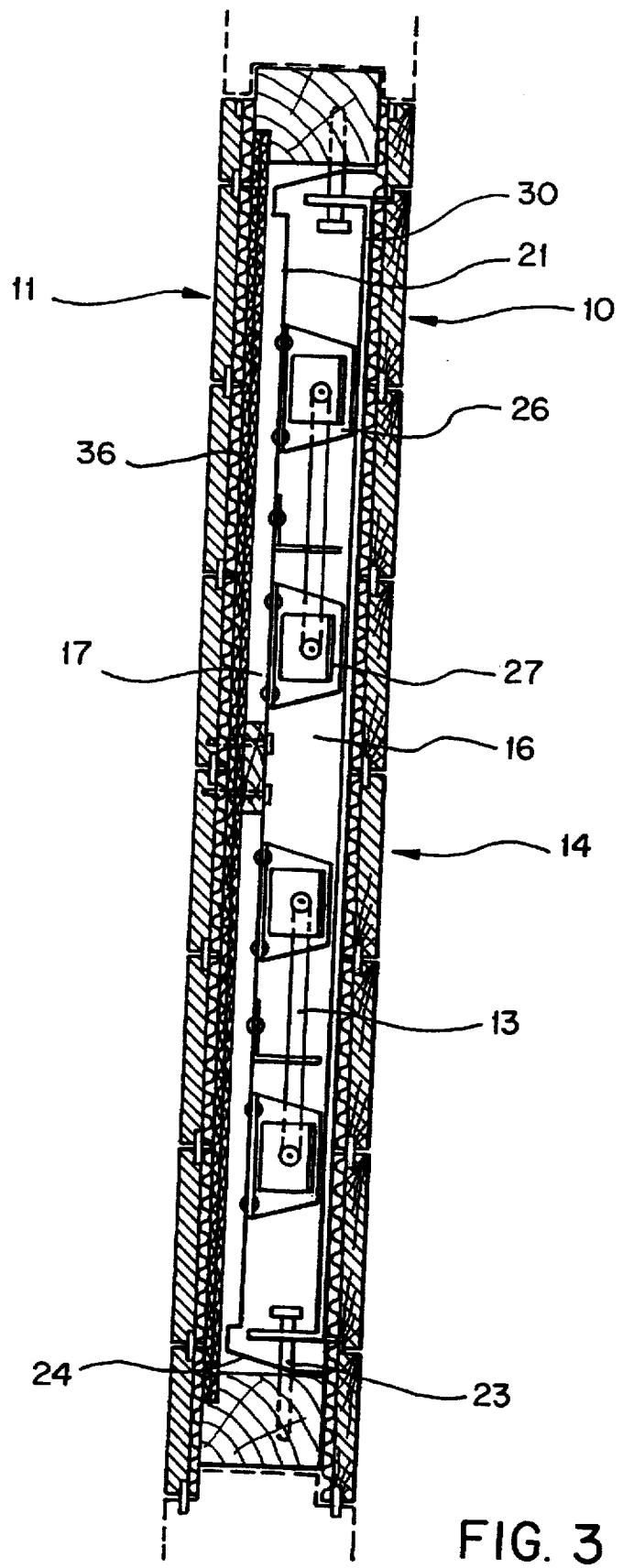
FIG. 3 is a horizontal section through the heating wall element of FIG. 1 according to line III—III.

FIG. 3 shows that the inner wall layer 10 is made from wood, for instance, tongue-and-groove boards which are inserted into one another and held on their rear side via a bracket 30. The bracket, in turn, is detachably hung into the already mentioned fastenings 23, so that the inner wall layer 10 can be removed towards the interior of the cabin.

The mixing chamber 8 in which the ambient air channel 16 and the fresh air channel 17 meet each other is positioned in the upper portion of the heating wall element 14. Depending on the rate at which fresh air is to be heated up to ambient air temperature, the mixing room may be configured to be large or small, with the effect that the reflecting layer 21 becomes higher or lower.

Both channels have a joint outlet 31 which guides air through the inner wall layer 10 into the interior of the cabin.

The radiant heating system 13 of the invention is preferably controlled with the aid of two temperature sensors. A limit temperature sensor 31 is installed next to an excess temperature fuse 34 in each heating wall element 14 and controls the heating current via an operating mode temperature controller 33. The limit temperature sensor 32 is arranged near the ceiling and is capable of measuring heat and radiation. An example thereof is the globe thermometer. In a control device which contains the temperature controller, the desired temperature is set in response to the mode of operation.

A fuse switch 35 may be provided in the same circuit together with the above-mentioned temperature sensors and the fuse so as to interrupt the current supply whenever the inner wall layer 10 is removed.

On its inside, the outer wall layer 11 has an insulating layer 36 which is, for instance, composed of a plurality of cardbord layers which are covered on their surface with an aluminum foil.

The radiant heating system of the invention serves to replace the standard sauna stove, which emits heat at one location, by a large-surface heating assembly which is integrated into the side walls of the cabin. To this end, the side walls are removed as radiation walls in that the tubular heating elements 25 directly or indirectly irradiate the wooden inner wall layer 10. In the immediate vicinity of the tubular heating elements, the screens 27 prevent excessive heating or burning of the wood. The radiation emitted by the tubular heating elements is guided, on the one hand, by the screens rearwardly and, on the other hand, by the reflecting layer 21 forwardly towards the interior of the cabin. This leads to a high emission of the wooden surface; nevertheless, one cannot get burnt when touching the warm or hot wood.

Apart from the radiation of the radiant heating system, there is convection. Convection is first of all effected due to the fact that the radiant heating system is located inside the ambient air channel 16, whereby cabin air is sucked in at the bottom via inlet 19 and rises uwpards within the channel. Fresh air is sucked in from the outside through the fresh air opening 20 and also rises upwards and transports the lost heat radiated rearwards by the reflecting wall upwards into the mixing chamber 18 where fresh air and ambient air mix to pass jointly through the outlet 31 into the interior of the cabin.

FIGS. 8 to 11 show a few possible embodiments of inventive cabins of the modular type. In the cabin according to FIG. 8, there are a plurality of heating wall elements 14 at the two longitudinal sides 2 and 4, and a few non-heatable wall elements 15. The vent hole 9 is provided at the shorter rectangular side 5. A total of five heating wall elements 14 are adjusted such that they effect convection apart from radiation. This is shown by arrows illustrating the air flow.

Two heating wall elements 14 which are positioned on the side wall 2 are however modified by accumulating webs such that they just emit radiation, so that there is no convection.

This results in a spiral flow which is directed from the side wall 3 towards the vent hole 9 of the side wall 5.

FIG. 9 shows how fresh air and ambient air flow in via a heating wall element 14 in the cabin portion near the ceiling.

Heating wall elements may additionally be installed or may be removed. Another modification is created by the use of heat guiding plates 28, since convection is promoted thereby. By contrast, accumulating webs prevent a convection and only permit radiation at heating wall elements 14.

The non-heatable wall elements 15 may be provided with reflecting layers to reflect the radiation received from the interior into the interior.

The cabins according to FIGS. 10 and 11 are oriented such that an approximately double roll-type flow is obtained. The explanations as given above in connection with FIGS. 8 and 9 are equally applicable. Depending on the arrangement of the heating wall elements 14 and the non-heatable wall elements 15, respectively, the flow can be varied. The same modifications are applicable to the heating wall elements. FIGS. 9 and 11 show that the ambient air channels 16 are made as high as the room. They develop a considerable chimney effect and can thus be referred to as thermal fans.

The non-heatable walls 15 have the same structure as the heating wall elements 14, with only a few parts being missing. For instance, the radiant heating system can be dispensed with, and also the ambient air channels with their openings. Only the reflecting layer 21 and, optionally, an insulating layer 36 are desired. The inlets and outlets can be dispensed with.

I claim:

1. A radiant heating cabin system for heating a cabin comprising a plurality of sidewalls and a door for allowing entry into and exit from said cabin, a radiant heating system integrated into at least one sidewall of said plurality of cabin sidewalls, said at least one sidewall comprising an inner wall layer, an outer wall layer, a bottom, a top, a height between said top and said bottom, an ambient air channel including an inlet adjacent said sidewall bottom, and an air outlet adjacent said sidewall top, said radiant heating system extending over a large surface in said at least one sidewall and positioned between said inner wall layer and said outer wall layer in said ambient air channel, said inner wall layer being made from wood via which the radiation from said radiant heating system radiates into said cabin, and said radiant heating system further comprising a reflecting layer between said inner wall layer and said outer wall layer.

2. The radiant heating cabin system according to claim 1, wherein said at least one side wall comprises a fresh air channel.

3. The radiant heating cabin system according to claim 2, wherein said fresh air channel extends in parallel with said ambient air channel.

4. The radiant heating cabin system according to claim 2, wherein said reflecting layer separates said ambient air channel from said fresh air channel.

5. The radiant heating cabin system according to claim 2, wherein said fresh air channel comprises an inlet in said outer wall layer.

6. The radiant heating cabin system according to claim 2, wherein said fresh air channel comprises an inlet disposed in said outer wall layer adjacent said sidewall bottom.

7. The radiant heating cabin system according to claim 1, wherein said inlet of said ambient air channel is positioned in said inner wall layer adjacent said sidewall bottom.

8. The radiant heating cabin system according to claim 2, wherein said ambient air channel and said fresh air channel have are in communication with said outlet, said outlet positioned in said inner wall layer.

9. The radiant heating cabin system according to claim 8, wherein said outlet is positioned upwardly on said inner wall layer.

10. The radiant heating cabin system according to claim 2, wherein said ambient air channel extends substantially over said height of said at least one sidewall.

11. The radiant heating cabin system according to claim 2, further comprising an air mixing chamber, wherein said ambient air channel and said fresh air channel are in communication with said air mixing chamber.

12. The radiant heating cabin system according to claim 1, wherein said inner wall layer is removable.

13. The radiant heating cabin system according to claim 1, wherein said outer wall layer comprises an insulating layer on its inside.

14. The radiant heating cabin system according to claim 13, wherein said insulating layer comprises at least one corrugated cardboard layer.

15. The radiant heating cabin system according to claim 1, said radiant heating cabin system further comprising at least one tubular heating element positioned in said at least one sidewall to heat the interior of said cabin by convection, radiation, or both.

16. The radiant heating cabin system according to claim 1, said radiant heating cabin system further comprising heat guiding plates for intensifying the convection.

17. The radiant heating cabin system according to claim 1, further comprising accumulating webs provided in said ambient air channel which subdivide said ambient air channel into shielded chambers to reduce convection and to intensify the radiation emitted from said radiant heating system.

18. The radiant heating cabin system according to claim 1, further comprising a plurality of modular wall elements including at least one non-heatable wall element of substantially the same size as said at least one sidewall, and that said plurality of modular wall elements comprises said at least one sidewall in the form of a heatable wall element.

19. The radiant heating cabin system according to claim 1, wherein said sidewalls are substantially dimensionally identical wall elements, said wall elements including heating wall elements and non-heatable wall elements alternately arranged side by side, said plurality of substantially dimensionally identical wall elements each comprising said radiant heating system.

20. The radiant heating cabin system according to claim 19, further comprising side walls which are opposite and in parallel with each other, said side walls comprising said plurality of substantially dimensionally identical wall elements arranged such that heating wall elements and non-heatable wall elements are opposite to one another.

21. The radiant heating cabin system according to claim 20, wherein said opposite and parallel sidewalls form a rectangle including two longs sidewalls and two short sidewalls, said heating wall elements are arranged in said long sidewalls, and further comprising a vent hole in one of said short sidewalls.

22. The radiant heating cabin system according to claim 19, wherein said non-heatable wall elements are each provided with a reflecting layer.

23. The radiant heating cabin system according to claim 1, further comprising two temperature sensors.

24. The radiant heating cabin system according to claim 23, wherein one of said two temperature sensors is a limit temperature sensor which is arranged in said sidewall.

25. The radiant heating cabin system according to claim 1, further comprising an operating mode temperature controller.

26. The radiant heating cabin system according to claim 23, wherein said two temperature sensors have a two-step control.

27. The radiant heating cabin system according to claim 15, further comprising an excess-temperature fuse which is arranged above said at least one tubular heating element.

28. The radiant heating cabin system according to claim 15, further comprising a spreadable mounting, wherein said at least one tubular heating element is detachably held within said at least one sidewall by said spreadable mounting.

29. The radiant heating cabin system according to claim 2, wherein said fresh air channel extends substantially over said height of said wall.

30. The radiant heating cabin system according to claim 2, wherein both said ambient air channel and said fresh air channel extend substantially over said height of said wall.

31. The radiant heating cabin system according to claim 14, wherein said at least one corrugated cardboard layer has an inside surface and is coated on said inside surface with an aluminum foil.

32. The radiant heating cabin system according to claim 16, wherein said heat guiding plates are made of aluminum.

* * * * *